US 11,653,687 B2

(12) United States Patent
Clune et al.

(10) Patent No.: US 11,653,687 B2
(45) Date of Patent: May 23, 2023

(54) THERMALLY INHIBITED WAXY CASSAVA STARCH

(71) Applicant: CORN PRODUCTS DEVELOPMENT, INC., Westchester, IL (US)

(72) Inventors: Hanna Clune, Bridgewater, NJ (US); John Garrison, Bridgewater, NJ (US); Douglas Hanchett, Bridgewater, NJ (US); Oyelayo Jegede, Bridgewater, NJ (US); Lynette Jernigan, Bridgewater, NJ (US); Bee Tin Kor, Bridgewater, NJ (US); Tarak Shah, Bridgewater, NJ (US); Suh Fang Thng, Bridgewater, NJ (US)

(73) Assignee: Corn Products Development, Inc., Westchester, IL (US)

( * ) Notice: Subject to any disclaimer, the term of this patent is extended or adjusted under 35 U.S.C. 154(b) by 227 days.

(21) Appl. No.: 16/645,204

(22) PCT Filed: Sep. 11, 2018

(86) PCT No.: PCT/US2018/050377
§ 371 (c)(1),
(2) Date: Mar. 6, 2020

(87) PCT Pub. No.: WO2019/055381
PCT Pub. Date: Mar. 21, 2019

(65) Prior Publication Data
US 2020/0315228 A1 Oct. 8, 2020

Related U.S. Application Data

(60) Provisional application No. 62/557,584, filed on Sep. 12, 2017.

(51) Int. Cl.
*A23L 29/212* (2016.01)
*A23L 27/60* (2016.01)
(Continued)

(52) U.S. Cl.
CPC ............ *A23L 29/212* (2016.08); *A23C 9/137* (2013.01); *A23C 9/1544* (2013.01);
(Continued)

(58) Field of Classification Search
CPC .......... A23L 29/212; A23L 27/60; A23L 9/10; A23L 5/17; A23C 9/137; A23C 9/1544;
(Continued)

(56) References Cited

U.S. PATENT DOCUMENTS 5,378,434 A 1/1995 Staffin et al.
5,928,707 A 7/1999 Mahr et al.
(Continued)

FOREIGN PATENT DOCUMENTS

CA 2542534 11/2013
CN 104045722 5/2016
(Continued)

OTHER PUBLICATIONS

Rolland-Sabate, et al., Structural characterization of novel cassava starches with low and high-amylose contents in comparison with other commercial sources, Food Hydrocolloids 27 (2012) 161-174.
(Continued)

*Primary Examiner* — Brent T O'Hern
(74) *Attorney, Agent, or Firm* — Jason Grauch

(57) ABSTRACT

This specification discloses thermally inhibited waxy cassava starches and edible compositions made therefrom. In one aspect edible compositions have improved creaminess compared to prior art starches, independent of starch usage level and the viscosity provided by the starch. In an embodiment the edible composition comprises between 0.1% and
(Continued)

35.0% by weight. In various embodiments the thermally inhibited waxy cassava starch has a peak viscosity of between about 100, and 2000 Brabender units or between 500 and 1500 Brabender Units.

14 Claims, 1 Drawing Sheet

(51) Int. Cl.
| | | |
|---|---|---|
| *A23L 9/10* | (2016.01) | |
| *A23L 5/10* | (2016.01) | |
| *A23C 9/137* | (2006.01) | |
| *A23C 9/154* | (2006.01) | |
| *A23D 7/005* | (2006.01) | |
| *C08B 30/14* | (2006.01) | |

(52) U.S. Cl.
CPC .............. *A23D 7/0056* (2013.01); *A23L 5/17* (2016.08); *A23L 9/10* (2016.08); *A23L 27/60* (2016.08); *C08B 30/14* (2013.01); *A23V 2002/00* (2013.01)

(58) Field of Classification Search
CPC ... A23D 7/0056; C08B 30/14; A23V 2002/00
USPC ......................................................... 426/579
See application file for complete search history.

(56) References Cited

U.S. PATENT DOCUMENTS

| | | | |
|---|---|---|---|
| 6,010,574 | A | 1/2000 | Jeffcoat et al. |
| 6,221,420 | B1 | 4/2001 | Thomas et al. |
| 6,451,121 | B2 | 9/2002 | Chiu et al. |
| 6,974,894 | B2 | 12/2005 | Cooke et al. |
| 6,982,327 | B2 | 1/2006 | Visser et al. |
| 7,022,836 | B2 | 4/2006 | Visser et al. |
| 7,422,638 | B2 | 9/2008 | Trksak et al. |
| 7,722,722 | B2 | 5/2010 | English et al. |
| 11,180,575 | B2 | 11/2021 | Lane et al. |
| 2003/0094104 | A1 | 5/2003 | Jeffcoat et al. |
| 2003/0099755 | A1 | 5/2003 | Huizinga et al. |
| 2003/0108649 | A1 | 6/2003 | Jeffcoat et al. |
| 2010/0261892 | A1 | 10/2010 | Weisser et al. |
| 2013/0309386 | A1 | 11/2013 | Xian-Zhong |
| 2014/0287131 | A1 | 9/2014 | Drew et al. |
| 2017/0064978 | A1* | 3/2017 | Hanchett .............. A23K 20/163 |

FOREIGN PATENT DOCUMENTS

| | | | |
|---|---|---|---|
| DE | 69637153 | 3/2017 | |
| EP | 0710670 A1 | 5/1996 | |
| EP | 1 314 743 A2 | 11/2002 | |
| EP | 1281721 A1 | 2/2003 | |
| EP | 2246365 A1 | 11/2010 | |
| EP | 3 000 327 A1 | 7/2015 | |
| EP | 3000327 A1 * | 3/2016 | ........... A23L 29/219 |
| EP | 3109259 A1 | 12/2016 | |
| EP | 3345932 A1 | 7/2018 | |
| JP | 2010259425 | 11/2010 | |
| RU | 2187944 | 8/2002 | |
| WO | 2000073353 A1 | 12/2000 | |
| WO | 2012003172 | 1/2012 | |
| WO | 2016133447 A1 | 8/2016 | |
| WO | 2018/069535 | 4/2018 | |

OTHER PUBLICATIONS

Suh Dong Soon et al: "Comparison of Starch Pasting Properties at Various Cooking Conditions Using the Micro Visco-Amylo-Graph and the Rapid Visco Analyser", Cereal Chemistry, vol. 80, No. 6, Nov. 2003, pp. 745-749.

Gustaw Waldemar et al.: "The rheological properties of yoghurt with incorporated whey protein aggregates/polymers", MILCHWIS-SENCHAFT, vol. 61, No. 4, Jan. 2006, pp. 415-419.

Kaur Ramandeep et al: "Sensory, rheological and chemical characteristics during storage of set type full fat yoghurt fortified with barley-glucan", Journal of Food Science and Technology, vol. 57, No. 1, Aug. 28, 2019, pp. 41-51.

Alakali J S et al: "Effect of whey protein enrichment on selected engineering and sensory properties of Pasteurised yoghurt", African Journal of Food Science, vol. 5, No. 7, Apr. 2011, pp. 392-399.

Megazyme, Starch Damage, Assay Procedure, Megazyme International Ireland 2015, pp. 1-11.

MVAG Manual, C.W. Brabender Instruments, Inc., 2005, pp. 1-104.

ICC Handbook "Cereals Testing Equipment", British Library Sep. 23, 2022, pp. 357-379.

Third Party Observations for EP Application No. EP20180796517, Oct. 11, 2021.

Third Party Observations for EP Application No. EP20190839240, Nov. 21, 2022.

\* cited by examiner

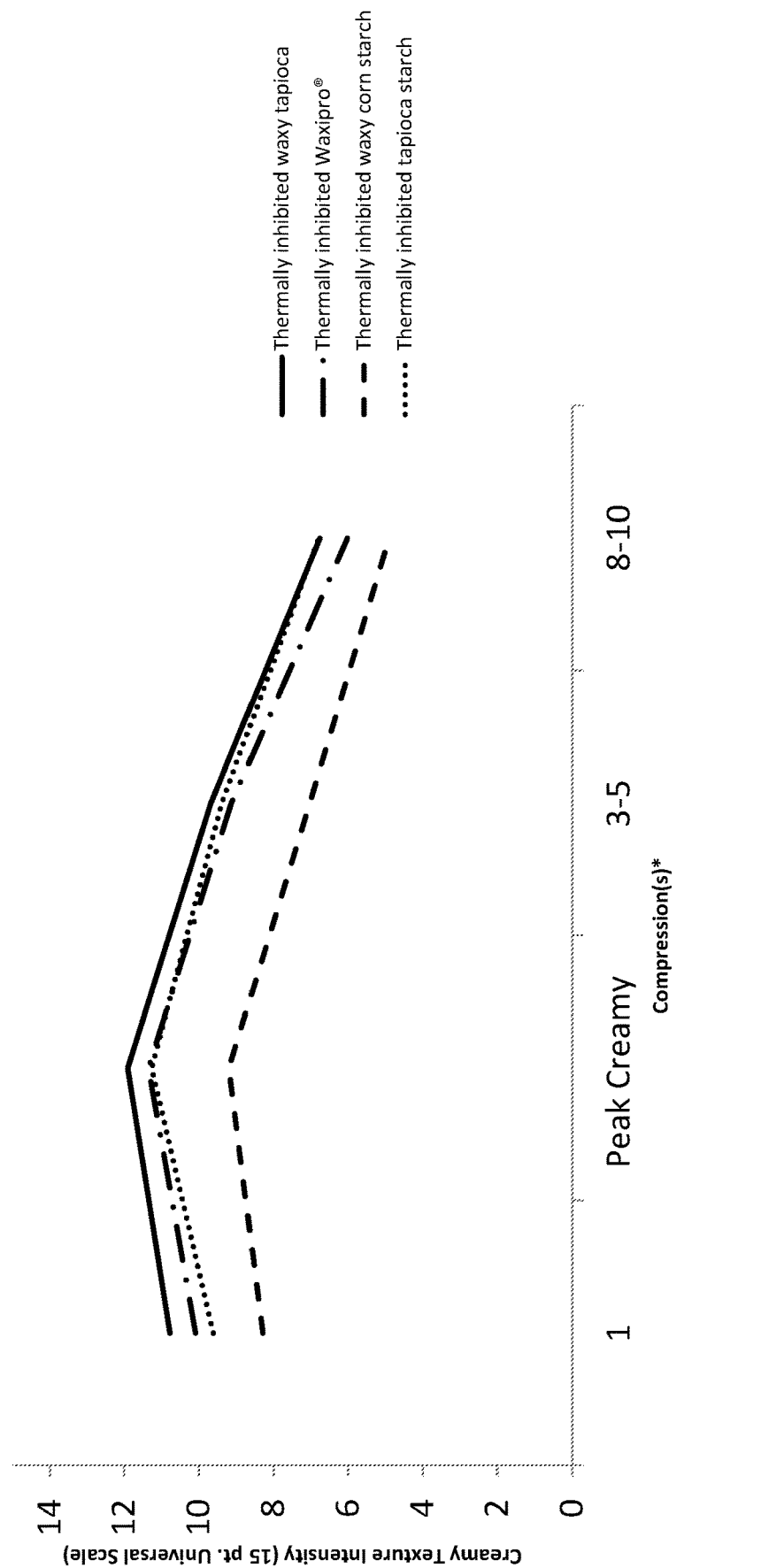

THERMALLY INHIBITED WAXY CASSAVA STARCH

CROSS-REFERENCE TO RELATED APPLICATIONS

This application is a US National Stage under 35 USC § 371 of International Application No. PCT/US2018/050377, filed Sep. 11, 2018, which claims priority to U.S. Provisional Application Ser. No. 62/557,584, filed on Sep. 12, 2017, which are—both hereby incorporated by reference herein in their entirety. This specification discloses edible compositions comprising a physically modified waxy cassava starch and more particularly a thermally inhibited waxy cassava starch.

This specification discloses edible compositions comprising a physically modified waxy cassava starch and more particularly a thermally inhibited waxy cassava starch.

In aspects this specification discloses a waxy cassava starch modified to have a specific peak viscosity or end viscosity. In some embodiments the end viscosity is between 100 and 2000 Brabender Units (BU). In another aspect this specification discloses an edible composition comprising a thermally inhibited waxy cassava starch in sufficient amount to affect the mouthfeel of an edible composition. One of many perceptual components is the perceived creaminess of the composition, which includes all physical and perceptual mouthfeel attributes provided by cream. Creaminess is related to many substituent properties including thickness, body, and mouth coating, and is caused at least in part by cream's fat content.

It is desirable in many edible compositions to reduce fat content, but this in turn tends to reduce the creaminess of the edible composition. So while the thickness of the edible composition may be increased by adding more starch, and may be stabilized by adding a chemically modified starch the sensory contribution derived from the fat is more difficult to replace.

Disclosed in this specification are edible compositions that unexpectedly improve the perceived creaminess of food products by using a thermally inhibited waxy cassava starch. In other embodiments the edible compositions had an improved mouthfeel compared to the prior art. In still another embodiment, the edible composition comprises between 0.1% and 35.0% by weight of the composition of a thermally inhibited waxy cassava starch (dry basis) having an amylose content of about 3% or less by weight of the starch (dry basis), and between 1% and 99% by weigh of the composition of an edible liquid ingredient wherein the waxy cassava starch is sufficiently thermally inhibited so that a slurry consisting of thermally inhibited waxy cassava starch at 6% by weight starch (dry basis) solids and a buffered pH of about 6.0 has an end viscosity of between 500 and 1500 Brabender Units (BU) and wherein the edible composition has a viscosity of between 1,000 and 50,000 cP.

In other embodiments the edible liquid may be a low fat or non-fat dairy product. In embodiments the composition is low fat and the low fat or non-fat dairy product and starch are used to replace a full fat dairy product. In still other embodiments the composition is low fat or non-fat and the starch replaces fat from an animal (including dairy) or plant source. In even other embodiments the edible liquid may be acidic. In other embodiments the composition may be pasteurized or may be frozen.

In embodiments the method for making the edible composition comprises adding to an edible liquid ingredient a thermally inhibited waxy cassava starch to form a composition the starch having an amylose content of about 3% or less by weight of the starch (dry basis) and developing, in a starch slurry consisting of 6% by weight starch (dry basis) solids, and at a pH of 6.0, an end viscosity of between 500 and 1500 Brabender Units; mixing the composition to disperse the starch within the edible liquid to form a dispersed composition; and optionally heating the dispersed composition; wherein the dispersion is mixed for sufficient time and optionally heated at sufficient temperature for the dispersion to form an edible composition having a viscosity of between 1,000 and 50,000 cP.

The inventions described in this specification are illustrated in part by the non-limiting embodiments set forth in FIG. 1.

FIG. 1 depicts the creaminess rating of an illustrative pudding comprising one of four different thermally inhibited base starches.

Within this specification waxy starch is intended to mean starch obtained from a plant having low amylose content. In embodiments, waxy starches have an amylose content of less than 10 wt. % (dry basis), or less than 5 wt. % (dry basis), or less than 3 wt. % v, or consisting of essentially no amylose (about 0%) (dry basis). Unless specifically distinguished, references to waxy cassava starch in this description are meant to include their corresponding flours.

Within this specification, native starch, is also called unmodified starch, and is granular starch that, after milling and separation to obtain the starch from the base plant material, is not further processed, for example by physical, enzymatic, or chemical means; for completeness a pregelatinized starch is not a native starch or an unmodified starch.

Within this specification substantially anhydrous starch has a moisture content (w/w) of less than about 5%.

Within this specification anhydrous starch has a moisture content (w/w) of less than about 2%.

Within this specification end viscosity means the viscosity, measured using a Brabender Micro-Visco-Amylo-Graph (MVAG), of a starch slurry, consisting of 6% by weight starch solids (dry basis) and an aqueous solution buffered at a pH of 6, measured at the end of the following time and temperature course: heat starch slurry from room temperature to 50° C.; 2) further heat slurry from 50° C. to 95° C. at a heating rate of 8° C./min; and 3) holding slurry at 95° C. for 15 minutes ("95° C.+15"). Peak viscosity refers to the highest viscosity measured during the above time and temperature course. Within this specification percent breakdown viscosity is the percent difference between the peak viscosity and the viscosity at 95° C.+15 min given by the equation % breakdown=(peak−(peak+15 min)*100)/peak, and a stable or rising viscosity is a viscosity that exhibits no breakdown during the following time and temperature course (which is the same as above): heat starch slurry from room temperature to 50° C.; 2) further heat slurry from 50° C. to 95° C. at a heating rate of 8° C./min; and 3) holding slurry at 95° C. for 15 minutes ("95° C.+15").

Creaminess is a sensory property characterized by the mouthfeel imparted by cream from milk. It has several related sensory components, these include melt away, perceived thickness, and mouth coating, all of which can be detected and rated by trained panelists. Sensory thickness is separate from instrumental viscosity in that it includes attributes such as the cohesiveness and smoothness of the edible composition within the mouth. Mouth coating refers to the perception of how completely the edible composition coats or spread in the mouth cavity during manipulation. It corresponds to the actual physical coating of the mouth, but includes other perceived attributes such as how evenly and cohesively the edible composition coats the mouth. Melt away relates to how long the perceived sensations of thickness and mouth coating lingers or takes to disappear in the mouth. These sensations are related to the actual physical break down of the composition, but also depend on how evenly and cohesively the perceptions of thickness and coating dissipate.

Creaminess can be evaluated as peak creaminess, creaminess after first compression, creaminess after 3-5 compressions and creaminess after 8-10 compressions of a food composition. In this specification these attributes are evaluated as defined in Table 1:

TABLE 1

Sensory Terminology and Scaling
PEAK CREAMY TEXTURE

| | |
|---|---|
| Definition | The extent to which a sample evenly spreads over the palate and tongue, deforming/stringing rather than shearing/cutting, requiring low force to completely remove from palate. |
| Technique | Take a spoonful of sample and with consistent force compress and manipulate sample between tongue and palate to measure the peak creamy texture. Use Large spoon |

| Comparative Food | Assigned Value |
|---|---|
| Baby Food Peas | 2 |
| Breakstone Fat Free Sour Cream | 7.5 |
| Jell-O Chocolate Pudding | 13 |

CREAMY TEXTURE - 1st Compression

| | |
|---|---|
| Definition | The extent to which a sample evenly spreads over the palate and tongue, deforming/stringing rather than shearing/cutting, requiring low force to completely remove from palate. |
| Technique | Take a spoonful of sample and with consistent force compress and manipulate sample between tongue and palate to measure the peak creamy texture. Use Large Spoon |
| Baby Food Peas | 2 |
| Breakstone Fat Free Sour Cream | 7.5 |
| Jell-O Chocolate Pudding | 13 |

CREAMY TEXTURE - 3-5 Compressions

| | |
|---|---|
| Definition | The extent to which a sample evenly spreads over the palate and tongue, deforming/stringing rather than shearing/cutting, requiring low force to completely remove from palate. |
| Technique | Take a spoonful of sample and with consistent force compress and manipulate sample between tongue and palate 3-5 times to measure the peak creamy texture. Use Large Spoon |

| Comparative Food | Assigned Score |
|---|---|
| Baby Food Peas | 2 |
| Breakstone Fat Free Sour Cream | 7.5 |
| Jell-O Chocolate Pudding | 13 |

CREAMY TEXTURE - 8-10 Compressions

| | |
|---|---|
| Definition | The extent to which a sample evenly spreads over the palate and tongue, deforming/stringing rather than shearing/cutting, requiring low force to completely remove from palate. |
| Technique | Take a spoonful of sample and with consistent force compress and manipulate sample between tongue and palate 8-10 times to measure the peak creamy texture. Use Large Spoon |
| Baby Food Peas | 2 |
| Breakstone Fat Free Sour Cream | 7.5 |
| Jell-O Chocolate Pudding | 13 |

An illustrative method for thermally inhibiting starch follows. The starch is dehydrated for a time and at a temperature sufficient to render the starch anhydrous or substantially anhydrous. Temperatures used to thermally dehydrate the starch are kept below 100° C., for example to 80° C. Thermal dehydration can be carried out by heating the starch in a conventional oven or any other heating device for a time and at a temperature sufficient to reduce the moisture content to substantially anhydrous or anhydrous. In other embodiments the pH of the starch maybe adjusted before or after dehydration to a range of from about 7.5 to about 10.5 using suitable bases known within the industry and approved by the Food and Drug Administration for such use.

In still other embodiments after dehydration, the starch is heat-treated for an amount of time and at a temperature or range of temperatures effective in inhibiting the starch. Typically, heat treatment is carried out at between about 120° C. to about 180° C., for between about 2 and about 5 hours. Longer times are required at lower temperatures to obtain more inhibited starches, and the temperature and time are adjusted to obtain the level of thermal inhibition desired. Thermal inhibition can be done using any conventional processes and equipment typically used in the art. In an embodiment, conventional ovens are used.

In one embodiment thermally inhibited starch is made as follows: The pH of the samples was raised by slurrying the starch or flour in water at 30-40% solids and adding a sufficient amount of buffer until the desired pH was reached. All samples were spray dried or flash dried as conventional in the art (without gelatinization). Control samples were not dehydrated further or heat treated. Measurements of pH on samples before or after the thermal inhibition steps were made on samples consisting of one part anhydrous starch or flour to four parts water. The samples were brought from ambient temperature to 125° C. until the samples became anhydrous, and were further heated to the specified heat treating temperatures. When the heat treating temperature was 165° C., the time to reach that temperature was less than three hours. Moisture level of the samples at the final heating temperature was about 0 wt. % (i.e., anhydrous).

In embodiments a thermally inhibited waxy cassava starch has a peak and/or end viscosity of between 100 and 2000 BU, or between 100 and 500 BU, or between 100 and 200 BU, or between 500 and 1100 BU, or between 800 and 1100 BU. In embodiments a thermally inhibited waxy cassava has a gelatinization entropy of between 12 and 15 or between 13 and 15 or between 14 and 15 J/g. In embodiments a thermally inhibited waxy cassava starch as a retrogradation entropy of between 2 and 6, or between 2 and 5 or between 3 and 4 or between 4 and 5 J/g. In embodiments a thermally inhibited waxy cassava starch as a % starch damage of between 2 and 4%, or between 2.5 and 4% or between 3 and 4%.

The thermally inhibited waxy cassava starch may be used in various applications. In embodiments the edible compositions are spoonable. In other embodiments the edible compositions are pourable. In still other embodiments the edible compositions have a viscosity in the range of between 1,000 and 50,000 cP, and all viscosity subranges within. Different edible compositions will have different target viscosities, for example yogurt drinks have a lower viscosity than cup set yogurts. In embodiments the edible composition includes, but are not limited to, for example, spoonable, pourable, or drinkable compositions. Other embodiments use the starch to replace or supplement dairy ingredients, and/or fat ingredients. In still other embodiment the starch may be used to help stabilized emulsified edible compositions systems using reduced fat or oil. In still other embodiments the edible composition is a yogurt, for example, a strained Greek-style yogurt, unstrained European-style yogurt, long-term, shelf-stable yogurt, cup set yogurt, or yogurt/yogurt-style beverage. In yet other embodiments the edible composition is a creamy soup including, for example, cream soups (mushroom, broccoli, asparagus, etc.), bisques, chowders, etc. In yet still other embodiments the edible composition is a refrigerated or long-term, shelf-stable dessert including, for example, puddings, or custards. In further embodiments the edible composition is a sauce, dressing, or gravy, including for example, cream sauces (béchamel), emulsion sauces (mayonnaise, hollandaise and béarnaise), gravies, and creamy style dressings (ranch, etc.). In the preceding embodiments and other embodiments having a defined viscosity, the viscosity of the edible composition will vary by less than 20%, or less than 10%, or less 5%, or between 0% and 5% over the intended shelf-life composition; the shelf-life is different for different compositions, but for embodiments it ranges between one week and one year, and all sub ranges within.

In yet still further embodiments the edible composition is a frozen composition or a gelled composition, including for example, ice cream (both hard and soft serve), frozen custard or baked custards, and cream pie fillings. In an even further embodiments the edible composition may be stored in frozen form and be thawed for use: use of waxy cassava starch in frozen applications may be particularly useful because it contributes to increased freeze-thaw stability compared to other thermally inhibited starches. In some embodiments a frozen composition will survive at least 5, or about 5 freeze thaw cycles without gelling wherein a freeze thaw cycle comprises storing a sample in a freezer at 20° C. for 8 hours and thawing the sample at room temperature for 7 hours.

In the above frozen, gelled, and viscous embodiments, as well as other embodiments, the starch may be used to replace some or all of the fat in the edible composition. In such embodiments the starch will replace between 1% and 100% (compared to a full fat composition) of the fat and the fat may be animal fat (e.g. lard or dairy fat), or vegetable fat, oil or shortening. In the above frozen, gelled, and viscous embodiments, as well as other embodiments, the edible composition may be acidic, for example having a pH between 3 and 6, or may be subjected to high temperature or pressure during preparation, for example, but not limited to pasteurization processes. In additional embodiments the edible composition may be supplied to the consumer as a mix, where the consumer is expected to add liquid and/or fat, and optionally heat to prepare the product.

In embodiments the edible composition comprises a thermally inhibited waxy cassava starch, and an edible liquid and optionally flavorings. In further embodiments, the thermally inhibited waxy cassava starch is used in amounts of between 0.1% and 35% by weight (dry basis) of the edible composition, and all subranges within. In still further embodiments the edible liquid is used in amounts between 1% and 99% by weight of the composition and subranges in within. In yet still another embodiment a spoonable edible composition, for example, but not limited to a pudding will comprises between 5% and 35% by weight of the thermally inhibited waxy cassava starch (dry basis) and between 95% and 65% by weight liquid. In even another embodiment, a pourable or drinkable edible composition comprises between 0.1% and 15% by weight thermally inhibited waxy cassava starch (dry basis) and 99.9% and 85% liquid. Any edible liquid may be used in the edible composition. In embodiments the edible liquid is, for example, but not limited to, milk, water, vinegar, fruit juice, oil, or syrup. Optionally any flavoring may be added to the edible composition. In embodiments of the edible composition the flavoring is provided in powdered or other dry form, for example, but not limited to cocoa powder, herbs, spices, seasonings, salts, and powdered flavorings. In other embodiments the flavoring is a liquid or liquefied ingredient such as, for example, an extract (from fruits, nuts, herbs, spices, vanilla, etc.), a puree of fruit and/or vegetables, a sweetening syrup and/or a flavoring syrup, and a flavoring oil. In still other embodiments edible compositions include other standard edible ingredients for example, but not limited to eggs, which may be whole eggs, egg whites, and powdered versions of the same, or other starches and/or flours from any source (e.g. wheat, corn, rice, potato, pulses, arrowroot, sorghum, sago, etc. as well as waxy or high amylose variants) gums or other colloids, lecithin, gelatin, dextrin, maltodextrins, protein, protein concentrates, and isolates from any source (e.g. pulse, soy, casein, whey, etc.), etc. In still further embodiments the optional ingredients are added to the starch and edible liquid as a solid, a liquid, a solution, a dispersion, a suspension, and/or an emulsion.

In embodiments the edible composition is yogurt. In another embodiment the yogurt comprises between 0.1% and 35% thermally inhibited waxy cassava starch by weight (dry basis), or between 1% and 10% by weight thermally inhibited waxy cassava starch (dry basis), or between 1 and 5% by weight thermally inhibited waxy cassava starch (dry basis), or between 2% and 4% by weight thermally inhibited waxy cassava starch (dry basis). In yet another embodiment the thermally inhibited waxy cassava starch used in the yogurt has a stable viscosity through 95° C.+15 minutes, or a peak viscosity of less than 1000 Brabender units ("BU") through 95° C.+15, or a peak viscosity of less than 500 BU through 95° C.+15. In even another embodiment the edible composition is a yogurt having a viscosity of between 5,000 cP and 8,000 cP. In even another embodiment, the edible composition is a yogurt comprising 2.65% by weight thermally inhibited waxy cassava starch (dry basis) and having a viscosity of between 5,000 and 8,000 cP after one day, or one week, or three weeks, or six weeks refrigerated storage. In yet even another embodiment the edible composition is a yogurt having a viscosity that varies by less than 10% over six weeks' refrigerated storage, or less than 7.5% over six weeks' refrigerated storage, or less 5% over six weeks' refrigerated storage, or between 0% and 5% over six weeks' refrigerated storage. In yet still even another embodiment such edible compositions is a spoonable yogurt, or a European style yogurt. In a further embodiment the edible composition is a yogurt having a viscosity of 10,000 cP after one day's storage at room temperature, or the viscosity is between 10,000 and 14,000 cP, after one day's storage, or is between 12,000 and 14,000 cP after one day's storage. In still other embodiments such edible compositions are a strained yogurt, or a Greek-style yogurt, or a long-term, shelf-stable yogurt In embodiments the edible compositions are gravies, sauces, or dressings. In embodiments such edible compositions optionally comprise an acidic component for example, but not limited to vinegar or fruit juice, in sufficient amounts such that the pH of the edible composition is between 3 and 6.5. In other embodiments the edible composition comprises between 0.1% and 35% thermally inhibited waxy cassava starch by weight (dry basis), or between 2.5% and 7.5% thermally inhibited waxy cassava starch by weight (dry basis), or between 1% and 10% thermally inhibited waxy cassava starch by weight (dry basis), or between 2% and 8% thermally inhibited waxy cassava starch by weight (dry basis), or between 4% and 6% thermally inhibited waxy cassava starch by weight (dry basis). In another embodiment the thermally inhibited waxy cassava starch has a stable peak viscosity through 95° C.+15 minutes, or has a stable viscosity through 95° C.+15 minutes of about 1100 Brabender units, or has a peak viscosity of about 1100 Brabender units with a viscosity break down at 95° C.+15 minutes of less than about 10%, or a peak viscosity of 800 and 1100 Brabender units with a break down at 95° C.+15 minutes of less than about 10%. In yet another embodiment the edible composition comprises between about 4% and 6% thermally inhibited waxy cassava starch by weight (dry basis) and has a viscosity between 15,000 and 30,000 cP; such embodiment is for example a spoonable dressing. In still another embodiment, the edible composition's initial viscosity varies by less than about 20% through between 1 and 12 months storage at refrigerated temperatures, or less than 15% through between 1 and 12 months storage at refrigerated temperatures, or less than 10% through between 1 and 12 months storage at refrigerated temperatures.

In embodiments the edible composition is frozen. In embodiments the edible composition is intended to be served frozen; such embodiments include, for example, but are not limited to frozen custard, or ice cream. In other embodiments the composition is intended to be melted before serving; such embodiments include, but are not limited to frozen soups. In another embodiment the edible composition is frozen and comprises thermally inhibited waxy cassava starch in amount of between 0.1% and 35% thermally inhibited waxy cassava starch by weight (dry basis), or between 1% and 10% thermally inhibited waxy cassava starch by weight (dry basis), or between 2.5% and 7.5% thermally inhibited waxy cassava starch by weight starch (dry basis), or between 3% and 5% thermally inhibited waxy cassava starch by weight (dry basis). In still another embodiment the thermally inhibited waxy cassava starch has a peak viscosity of greater than 1200 BU, or greater than 1600 BU or between 1200 and 2000 BU, or between 1400 and 1700 BU.

In various embodiments a thermally inhibited waxy cassava starch is added to an edible composition to provide viscosity to the composition. In various embodiments a thermally inhibited waxy cassava starch is added to an edible composition in sufficient amount provide a creamy sensory texture to the composition. In various embodiments an edible composition is formulated to provide a desired creamy texture and/or viscosity with lower usage of thermally inhibited waxy cassava starch than would be required to achieve a matching viscosity using a different base starch. In the various embodiments amount of thermally inhibited waxy cassava will depend on the particular use. In various embodiments, an edible composition comprises between 0.1% and 35.0% (by weight of the composition) thermally inhibited waxy cassava starch (dry basis), or between 1% and 20% or between 1 and 10% or between 1 and 7.5% or between 1 and 5% or between 1 and 3%. In various embodiments an edible composition comprising a thermally inhibited waxy cassava is formulated to have a viscosity of between 1,000 and 50,000 cP, or between 1,000 and 25,000 cP, or between 1,000 and 15,000 cP or between 1,000 and 10,000 cP, or beteen 1,000 and 7,500 cP or between 2,500 and 7,500 cP or 3,000 and 7,000 cP, or 3,500 and 7,000 cP, or 4,000 and 7,000 cP, or 4,000 and 6,500 cP, or 4,000, and 6,000 cP or 4,000 and 5,500 cP, or 4,000 and 5,000, or about 5,000 cP.

In one or more embodiments a thermally inhibited waxy cassava starch is used to provide viscosity to a long-term, shelf-stable yogurt. Such yogurts are intended to be stored at ambient temperatures for long periods of time, for example up to six months, without substantial change in viscosity. Such yogurts are made by heat-treating (e.g. to pasteurize) a yogurt after fermentation. In embodiments a long-term, shelf-stable yogurt comprises between 1% and 3% thermally inhibited waxy cassava starch, or between 1% and 2.5% or between 1% and 2.2% or between 1% and 2%. In various embodiments a long-term, shelf-stable yogurt comprises a thermally inhibited waxy cassava starch having a peak viscosity of less than of less than 500 BU, or less than 200 BU or between 100 and 500 BU or between 100 and 200 BU. In various embodiments a long-term, shelf-stable yogurt comprising thermally inhibited waxy cassava starch has a viscosity of between 1,000 and 10,000 cP, or beteen 1,000 and 7,500 cP or between 2,500 and 7,500 cP or 3,000 and 7,000 cP, or 3,500 and 7,000 cP, or 4,000 and 7,000 cP, or 4,000 and 6,500 cP, or 4,000, and 6,000 cP or 4,000 and 5,500 cP, or 4,000 and 5,000, or about 5,000 cP. In various embodiments a long-term, shelf-stable yogurt comprising thermally inhibited waxy cassava starch has a viscosity of between 1,000 and 10,000 cP, or beteen 1,000 and 7,500 cP or between 2,500 and 7,500 cP or 3,000 and 7,000 cP, or 3,500 and 7,000 cP, or 4,000 and 7,000 cP, or 4,000 and 6,500 cP, or 4,000, and 6,000 cP or 4,000 and 5,500 cP, or 4,000 and 5,000, or about 5,000 cP after between 1 and 5 months storage at ambient temperature. In various embodiments a long-term, shelf-stable yogurt comprising a thermally inhibited waxy cassava starch has a flowability of between 5 and 6 (cm/60 sec) after between 1 and 5 months storage.

In various embodiments long-term, shelf-stable yogurts comprising a thermally inhibited waxy cassava starch made using high pressure homogenization (above 2000 psi). In various embodiments long-term, shelf-stable yogurts comprising a thermally inhibited waxy cassava starch is made using one or more, two or more, or three or more heating steps wherein the food composition or an intermediate form of the composition comprising thermally inhibited waxy cassava starch is heated to a temperature to between 50° and 100° C., or between 60° and 100° C., or between 70° and 100° C., or between 80° and 100° C., or between 90° and 100° C. of between 5 minutes and 30 minutes. In various embodiments long-term, shelf-stable yogurts comprising a thermally inhibited waxy cassava starch is fermented to have a pH below 4 and 5.

In one or more embodiments a thermally inhibited waxy cassava starch is added to an edible composition, for example, including but not limited to, a yogurt, a pudding, a dressing, or a sauce (or a Béchamel sauce or a mayonnaise) to provide creaminess to the composition. As used in this specification creaminess is measured by a trained of tasters and comprises the attributes of peak creaminess, creaminess after a first compression, creaminess after a 3-5 compressions, and creaminess after 8-10 compressions. Such terms are defined and measured as set forth in Table 11.

In one or more embodiments a composition comprises a thermally inhibited waxy cassava starch having a peak viscosity of between of between 500 and 1100 BU, or between 800 and 1100 BU. In at least one embodiment such composition is a pudding comprising. In at least one embodiment an edible composition (for example a pudding) comprises sufficient thermally inhibited waxy cassava to modify the texture of composition. In various embodiments an edible composition (for example a pudding) comprises between 1% and 10% or between 2% and 8% or between 3% and 7% or between 3% and 6%, or between 3% and 5%, or between 3% and 4% thermally inhibited waxy cassava starch by weight. In embodiments a pudding has a viscosity of between 1,000 and 10,000 cP, or beteen 1,000 and 7,500 cP or between 2,500 and 7,500 cP or 3,000 and 7,000 cP, or 3,500 and 7,000 cP, or 4,000 and 7,000 cP, or 4,000 and 6,500 cP, or 4,000, and 6,000 cP or 4,000 and 5,500 cP, or 4,000 and 5,000, or about 5,000 cP.

In embodiments a thermally inhibited waxy cassava starch is used in sufficient amount to modify the viscosity of an edible composition (for example in amounts between 1% and 10% or between 2% and 8% or between 3% and 7% or between 4% and 7%, or between 5% and 7%, or between 6% and 7% thermally inhibited waxy cassava starch). In various embodiments a thermally inhibited waxy cassava starch is used in sufficient amount to increase the perceived creaminess of an edible composition (for example in amounts between 1% and 10% or between 2% and 8% or between 3% and 7% or between 4% and 7%, or between 5% and 7%, or between 6% and 7% thermally inhibited waxy cassava starch).

This specification also discloses methods for making edible compositions comprising waxy cassava starch. In one embodiment a method for making an edible composition comprises mixing between 0.1 and 35% or between 1% and 20% or between 1% and 10% or between 1% and 7.5% or between 1% and 5% or between 1% and 3% by weight of the composition of a thermally inhibited waxy cassava starch having a peak viscosity of between 100 and 2000 BU, or between 100 and 500 BU, or between 100 and 200 BU, or between 500 and 1100 BU, or between 800 and 1100 BU with an edible aqueous liquid to form a mixture cooking the mixture; and c) subjecting the mixture to homogenization at between 750 and 2750 psi (between about 500 and about 1,900 kPa) or between 1250 and 2750 psi, or between 1500 and 2750 or between 1700 and 2750 psi in order to obtain an edible composition having a viscosity between 1,000 and 10,000 cP, or between 1,000 and 7,500 cP or between 2,500 and 7,500 cP or between 3,000 and 7,000 cP, or between 3,500 and 7,000 cP, or between 4,000 and 7,000 cP, or between 4,000 and 6,500 cP, or between 4,000, and 6,000 cP or between 4,000 and 5,500 cP, or between 4,000 and 5,000, or about 5,000 cP.

This specification also discloses methods of modifying the texture of an edible emulsion comprising a portion of a base starch that is not a thermally inhibited waxy cassava starch and a portion that is thermally inhibited waxy cassava, the process comprising: substituting at least a portion of the base flour that is not thermally inhibited waxy cassava starch with a thermally inhibited waxy cassava starch to form a starch component; mixing the starch component with an edible liquid to form a mixture; cooking the mixture and subjecting the mixture to homogenization at between 750 and 2750 psi (between about 500 and about 1,900 kPa) or between 1250 and 2750 psi, or between 1500 and 2750 or between 1700 and 2750 psi. In embodiments of the method a thermally inhibited waxy cassava starch is substituted at least 5%, at least 10%, at least 20%, at least 30%, at least 40%, at least 50%, and up to 100% of the base starch that is not a thermally inhibited waxy cassava starch. In embodiments of the method the edible composition comprises between 0.1 and 35% or between 1% and 20% or between 1% and 10% or between 1% and 7.5% or between 1% and 5% or between 1% and 3% by weight starch. In embodiments the thermally inhibited starch as an end viscosity of starch having a peak viscosity of between 100 and 2000 BU, or between 100 and 500 BU, or between 100 and 200 BU, or between 500 and 1100 BU, or between 800 and 1100 BU. In embodiments the edible emulsion has a viscosity between 1,000 and 10,000 cP, or between 1,000 and 7,500 cP or between 2,500 and 7,500 cP or between 3,000 and 7,000 cP, or between 3,500 and 7,000 cP, or between 4,000 and 7,000 cP, or between 4,000 and 6,500 cP, or between 4,000, and 6,000 cP or between 4,000 and 5,500 cP, or between 4,000 and 5,000, or about 5,000 cP.

The specification further discloses use of a thermally inhibited waxy cassava starch to modify the texture of an edible composition, and methods of making an edible composition and methods of modifying the texture of an edible composition comprising starch.

The invention can be described by way of the following aspects which are not intended to be limiting in any way:

In a first aspect this specification describes an edible composition comprising a thermally inhibited waxy cassava starch and an edible liquid wherein the edible composition is a thermally inhibited waxy cassava variant of a base composition and wherein the edible composition has at least one of a perceived thickness rating, a mouth coating rating, rating that exceeds the rating of a base composition comprising no thermally inhibited waxy cassava starch or a melt away that is slower than the rating of a base composition comprising no thermally inhibited waxy cassava starch.

In second aspect this specification describes an edible composition comprising: a) between 0.1% and 35.0% by weight of the edible composition of a thermally inhibited waxy cassava starch on a dry basis having an amylose content of about 3% or less by weight of the starch on a dry basis, and b) between 1% and 99% by weight of an edible liquid ingredient; wherein the waxy cassava starch has been sufficiently thermally inhibited so that a starch slurry consisting of 6% starch solids by weight and a buffered aqueous solution having a pH of 6.0 has a peak viscosity of between 500 and 1500 Brabender Units (BU); and wherein the edible composition has a viscosity of between 1,000 and 50,000 cP.

In a third aspect this specification describes an edible composition as described in the any of the preceding aspects being selected from the group consisting of yogurts, sauces, gravies, dressings, spreads, puddings, custards, ice creams, pie fillings, and beverages.

In a fourth aspect this specification describes an edible composition as described in any of the preceding aspects wherein the starch makes up between 1% and 10% by weight of the composition.

In a fifth aspect this specification describes an edible composition as described in any the preceding aspects wherein the edible liquid is a reduced fat or non-fat dairy product.

In a sixth aspect this specification describes an edible composition as described in of any the preceding aspects wherein the composition is a reduced fat or non-fat version of a base composition and wherein at least one of a perceived thickness rating, a mouth coating rating, and a melt away rating of the reduced fat or non-fat version of the base composition is comparable to the rating of a base composition comprising full fat.

In a seventh aspect this specification describes an edible composition as described in the any of the preceding aspects wherein the composition is a pudding.

In an eighth aspect this specification describes an edible composition as described in the any of the preceding aspects wherein i) the starch is used in amount between 3% and 5% by weight of the composition on a dry basis, and the starch slurry has a peak viscosity of between 500 and 1000 BU; and ii) wherein the liquid is a reduced fat or non-fat milk, and is used in an amount of between 80% and 90% by weight of the composition.

In a ninth aspect this specification describes an edible composition as described in the any of the preceding aspects consisting essentially of 84% by weight reduced fat milk, 10% by weight sweetener; 5.5% by weight starch on a dry basis; and 0.5% by weight flavoring, wherein the composition has a creaminess rating of at least 10.

In a tenth aspect this specification describes an edible composition as described in the any of the preceding aspects having a creaminess rating of at least 10.

In an eleventh aspect this specification describes an edible composition as described in the any of the preceding aspects having a creaminess rating of at least 10, the composition being selected from the group consisting of compositions having a pH lower than 6, pasteurized compositions, and defrosted compositions.

In a twelfth aspect this specification describes an edible composition as described in the any of the preceding aspects wherein the viscosity of the composition varies less than 10% over six weeks.

In a thirteenth aspect this specification discloses a dry mix comprising a thermally inhibited waxy cassava starch and a second edible dry ingredient.

In a fourteenth aspect this specification discloses in an edible composition comprising a starch, a method of increasing the perceived creaminess comprising: adding to an edible liquid ingredient a thermally inhibited waxy cassava starch to form a composition the starch having an amylose content of 3% or less by weight of the starch on a dry basis and developing, in a starch slurry consisting of 6% starch solids by weight on a dry basis and an aqueous solution buffered at a pH of 6.0, a peak viscosity of between 500 and 1500 Brabender Units; mixing the composition to disperse the starch within the edible liquid to form a dispersed composition; and optionally heating the dispersed composition; wherein the dispersion is mixed for sufficient time and optionally heated at sufficient temperature for the dispersion to form an edible composition having a viscosity of between 1,000 and 50,000 cP.

In a fifteenth aspect this specification discloses a method according to the fourteenth aspect wherein is added to the liquid such that the starch makes up between 0.1 and 35% by weight on a dry basis of the edible composition.

In a sixteenth aspect this specification discloses a method according to the fourteenth or fifteenth aspect wherein the edible liquid is a reduced fat or non-fat dairy product.

In a seventeenth aspect this specification discloses a method according to the any of the fourteenth through sixteenth aspects further comprising pasteurizing the edible composition.

In an eighteenth aspect this specification discloses a method according to the any of the fourteenth through seventeenth aspects further comprising freezing the edible composition.

In a nineteenth aspect this specification discloses a method according to the any of the fourteenth through eighteenth aspects further comprising defrosting the edible composition.

In a twentieth aspect this specification discloses a method according to the any of the fourteenth through nineteenth aspects further comprising adding a sweetener to the edible composition in an amount such that the sweetener makes up about 10% of the composition by weight wherein i) the edible liquid is a reduced fat milk; ii) the starch is added to the liquid in sufficient amount such that it makes up between 3 and 5% by weight of the composition on a dry basis, iii) wherein the starch slurry has a peak viscosity of between 500 and 1000 BU; and iv) the composition is heated to 90° C. during mixing; and wherein the composition is mixed for 40 minutes at 90° C.

This invention can be further described by the following examples, which are not intended to be limiting in any way.

Example 1—Illustrative Recipes

1a. Yogurt:

TABLE 2

| Yogurt Recipe | |
|---|---|
| Ingredients | Wt. % |
| Non-fat milk | 95.01 |
| Nonfat dry milk low heat | 1.34 |
| Gelatin | 0.3 |
| Starch | 3.35 [2] |
| Total | 100.0% |

All the dry ingredients are blended together and added to the milk. The mixture is blended using a Breddo Likwifier blender for 20-30 minutes at about 500 rpm, transferred to an holding tank, and then processed through MicroThermics® HVHW HTST processing equipment wherein, for upstream processing, the mixture is homogenized at 60° C. (140° F.) and 725 or 2175 psi, and then pasteurized at 98° C. (208° F.) for 6 minutes. For downstream processing, the mixture was preheated to 65° C. (150° F.), and then heated at 85-90° C. (185-195° F.) and 725 or 2175 psi for 6 minutes. The pasteurized yogurt mix was cooled to about 43° C. (110° F.). In samples that are fermented, the pH was reduced to 4.6 and the yogurt cooled to about 7-13° C. (45-55° F.). In other embodiments homogenization is run at 65° C. In embodiments the homogenization process includes a pre heat, and in embodiments temperature and pressure are ramped from ambient to those desired from pasteurization.

1b. Mayonnaise

TABLE 3

| Mayonnaise Recipe | |
|---|---|
| Ingredients | Wt. % |
| Water | 55.35 |
| Vinegar (10%) | 4.50 |
| Mustard (medium spicy) | 2.50 |
| Egg yolk (pasteurized) | 3.50 |
| Rape seed oil | 25.00 |
| Sugar | 3.00 |
| Salt | 1.00 |
| Potassium sorbate | 0.15 |
| Starch | 5.00[3] |
| Total | 100.00 |

All the dry ingredients are blended together and added to the water. The mixture is blended under vacuum (600-700 mbar) using a Fryma Korum DISHO 7 inline homogenizer. The water phase is then heated to 95° C. to cook the starch, and then cooled to 30° C. or below. The egg yolk is added and blended with the water phase. The oil is then added to the pre-emulsion under high shear and vacuum (600-700 mbar) and homogenized until emulsified. The vinegar is then added and emulsified, and the temperature kept at about 20° C.

1c. Spoonable Dressing—

TABLE 4a

| Formulation Part 1 - Spoonable Dressing | |
|---|---|
| Ingredients | Wt. % |
| Water | 61.00 |
| Vinegar (120 grain) | 12.50 |
| Sugar | 17.70 |
| Mustard powder | 1.10 |
| Paprika | 0.10 |
| Salt | 2.60 |
| Starch[1] | 5.00 |
| Total | 100.00 |

All the dry ingredients are blended together and added to the water and vinegar under agitation for complete dispersion. The mixture is heated to 195° C. to 200° C. for about 15 to 20 minutes to a good degree of starch cook. The resultant paste is then cooled to 80° C. The following ingredients are then added together—

TABLE 4b

| Formulation Part 2 - Spoonable Dressing | |
|---|---|
| Ingredients | Wt. % |
| Paste | 65.00 |
| Egg yolks | 4.50 |
| Vegetable oil | 30.50 |
| Total | 100.00 |

The egg yolks are added to the paste and mixed well. The oil is then slowly added with agitation to form a pre-emulsion. This pre-emulsion is then passed through a colloid mill to form the final spoonable dressing emulsion.

1d. Cream Soup—

TABLE 5

| Cream Soup recipe | |
|---|---|
| Ingredients | Wt. % |
| Water | 68.9 |
| Cream | 15.0 |
| Mushrooms [1] | 10.0 |
| Sugar | 0.71 |
| Salt | 0.7 |
| Onion Powder | 0.25 |
| Lecithin (8.7% on fat) | 0.5 |
| White Pepper | 0.04 |
| Starch [2] | 3.9 |
| Total | 100.0% |

All dry ingredients are blended together. The water and cream are added to a beaker and the lecithin dispersed using an immersion blender. The dry ingredients are then added under agitation. The mixture was heated to 88° C. to 90° C. (190° F. to 195° F.) and held until a good starch cook is reached (about 12 to 18 minutes). Once cooled, each mixture was then used to fill 2 ounce jars. Powdered mixes can be made by substituting dry ingredients such as powdered milk solids for cream.

1e. Béchamel

TABLE 6

Bechamel Recipe

| Ingredients | Wt. % |
|---|---|
| Whole Milk | 91.28 |
| Unsalted Butter | 5.00 |
| White Pepper | 0.02 |
| Salt | 0.30 |
| Starch | 3.00 |
| Soy Lecithin | 0.40 |
| Total | 100.00 |

1f. Pudding

TABLE 7

Pudding Recipe

| Ingredients | Wt. % |
|---|---|
| Milk 2% | 84.55 |
| Sugar | 10.00 |
| Starch | 5.25 |
| Vanilla Flavor | 0.20 |
| Total | 100.00 |

Pudding are made by whisking the starch, sugar, and vanilla into milk and mixing until the ingredients are dispersed. The mixture is then cooked in a Thermomix® with set temperature to 90° C. During cooking the mixture is stirred at speed 1 for 40 minutes or until starch is fully cooked out. The cooked pudding is then filled into jars and allowed to cool.

In industrial scale processes, all the dry ingredients are blended together and added to the milk. The mixture is blended using a Breddo Likwifier blender for 20-30 minutes at about 500 rpm, transferred to an holding tank, and then processed through MicroThermics® HVHW HTST processing equipment wherein, for upstream processing, the mixture is homogenized at 60° C.-65° C. (140-150° F.) and 725-2175 psi, and then pasteurized at 98° C. (208° F.) for 30 seconds. The cooked pudding is then filled into jars and allowed to cool.

Example 2—Functional Characterization

This example provides viscosity data characterizing a long-term, shelf-stable yogurt. Two formulations are provided one comprising 2.2% (w/w) thermally inhibited waxy cassava starch and one comprising 2.0% (w/w) thermally inhibited waxy cassava starch. These formulations were compared to a control made using 2.2% thermally inhibited waxy corn starch. The thermally inhibited starches (waxy cassava and waxy corn) were inhibited to have identical viscosity profiles and to have a peak viscosity of less than 200 BU.

Table 8 provides the recipe for the three formulations.

TABLE 8

Long-term, Shelf-Stable Yogurt

| | % | | |
|---|---|---|---|
| Ingredients | Waxy Corn | Waxy Cassava | Waxy Cassava |
| Whole milk | 82.00 | 82.00 | 82.00 |
| Whey protein concentrate 80 | 0.50 | 0.50 | 0.50 |
| Sugar | 8.00 | 8.00 | 8.00 |
| Thermal inhibited starch | 2.20 | 2.20 | 2.00 |
| Water | 7.30 | 7.30 | 7.50 |
| Total | 100.00 | 100.00 | 100.00 |

The ingredients were mixed well in a Cowl mixer and heated to a preheat temperature of 60-65° Celsius. The mix was then homogenized by a double stage homogenizer at 2610 psi. Homogenized mix was transferred to Cowl mixer and pasteurized at 90° Celsius for 10 minutes. Pasteurized milk was rapidly cooled down to 43° Celsius and yogurt culture was added and mix was allowed to ferment. When pH reached 4.5, yogurt was stirred and transferred to Armfield heat treatment machine for second pasteurization at 77° Celsius for 15 seconds. Thermalized yogurt was then packaged.

Example 2a—Characterization Procedures

Level of inhibition—was characterized using viscosity of starch slurry which was measured using Brabender® Micro Visco-Amylo-Graph® ("MVAG"), after thermally inhibited starch was dispersed in water and gelatinized. Viscosity was run at 6.0% by weight starch solids (dry basis) at pH 6. The starch slurry was mixed well with a stirring rod to disperse the sample. The sample cup was inserted in the MVAG instrument and the following temperature profiles were run to determine hot and cold pasting profile—1) heating of starch slurry from room temperature to 50° C.; 2) further heating of slurry from 50° C. to 95° C. at a heating rate of 8° C./min; and 3) holding slurry at 95° C. for 15 minutes.

Yogurt viscosities were measured using a Model RVT Brookfield Viscometer using a #5 spindle. The test sample is placed in position and the spindle is lowered into the sample. The viscometer is turned on and the spindle is rotated at a constant speed for at least 3 revolutions before a reading is taken.

Yogurt thickness was measured using a Bostwick consistometer at 25° Celsius.

Example 2b—Results

Table 9 reports the viscosity of samples after 1 day, and 1, 2, and 5 months storage (ambient temperature). Table 9 reports the viscosity of samples after 1 day, 1, 2, 3, 4, and 5 months storage (ambient temperatures).

TABLE 9

Viscosity of Long-term, Shelf-Stable Yogurt over Time

| Thermal inhibited starch | Starch dosage (%) | Viscosity at 25 Celsius (cps) - Brookfield viscometer | | | | | |
|---|---|---|---|---|---|---|---|
| | | Day 1 | Months 1 | 2 | 3 | 4 | 5 |
| Waxy corn | 2.2 | 4200 | 4800 | 4800 | 3800 | 6300 | 5000 |
| Waxy cassava | 2.2 | 4400 | 5800 | 6600 | 4800 | 8800 | 5600 |
| Waxy cassava | 2.0 | 3800 | 5400 | 5000 | 4900 | 7400 | 5200 |

TABLE 9

Flow Rate Long-term, Shelf-Stable Yogurt over Time

| Thermal inhibited starch | Starch dosage (%) | Flow at 25 Celsius (cm/60 seconds) - Bostwick consistometer | | | | | |
|---|---|---|---|---|---|---|---|
| | | Day 1 | Months 1 | 2 | 3 | 4 | 5 |
| Waxy corn | 2.2 | 8.5 | 6.2 | 6.3 | 6.0 | 6.2 | 5.8 |
| Waxy cassava | 2.2 | 6.8 | 4.8 | 4.7 | 4.8 | 4.3 | 4.2 |
| Waxy cassava | 2.0 | 7.0 | 5.7 | 5.1 | 5.0 | 5.0 | 4.7 |

Example 3—Sensory Characterization

This example provides sensory data comparing vanilla pudding samples prepared using one of waxy cassava, cassava (non-waxy), waxy corn, and WaxiPro®, seed for maize, (available from Ingredion Incorporate). Samples were thermally inhibited to one of two levels inhibition. Some samples were highly inhibited, having a peak Brabender viscosity (measured as reported above) of less than about 500 BU. Other samples were moderately inhibited, having a peak Brabender viscosity of between greater than about 500 and less than about 1100. All samples were processed to have matched viscosity profiles. All samples tested for sensory evaluation were made using the recipe provided in Table 10. Samples were formulated to have matched viscosity and so used starch amount between 6.3 and 7.1% of the formulation.

Pudding was chosen as a relatively bland, neutral pH, edible composition to best isolate on the palate the textural effects of the tested thermally inhibited starch. A person of skill in the art would understand that the basic principles and findings set forth in these experiments can be applied to a broader set of edible composition including yogurts, dressing which may be formulated to have acidic pH and more strongly flavored puddings, custards, and similar composition.

TABLE 10

Pudding for Senory Testing

| Ingredients (wt %) | Sample 1 | Sample 2 | Sample 3 | Sample 4 |
|---|---|---|---|---|
| Milk 2% | 83.70 | 83.70 | 83.70 | 83.70 |
| Sugar | 10.00 | 10.00 | 10.00 | 10.00 |
| Thermally inhibited tapioca starch | 6.30 | 0.00 | 0.00 | 0.00 |
| Thermally inhibited waxy corn starch | | 6.30 | | |
| Thermally inhibited WaxiPro ®, | | | 6.80 | |
| Thermally inhibited waxy tapioca | | | | 6.80 |
| Total | 100.00 | 100.00 | 100.00 | 100.00 |

The procedure for making puddings for sensory evaluation is as follows: Pre-blend of dry ingredients formed prior to processing. Dry pre-blend was added to skim milk in a Likwifier and mixed for 20-30 minutes at approximately 500 rpm. The mixture was then transferred to a holding tank and then processed through the Microthermics HVHW HTST processing equipment, with an Upstream process. The pre-heat was 140 F, and then homogenized at 1740 psi. The mix was then pasteurized at 208° F. and held for 30 seconds. Batch then cooled and collected into a bowl. 0.2% of Vanilla flavor will be added to the pudding and then it is dispensed into the samples cups.

Example 3b—Sensory Characterization Procedure and Results

Sensory testing was done using a trained panel. Panelists were selected based on their ability to detect differences in aroma, flavor, taste and texture and their ability to express these differences. Individual panelists were trained for 4 months prior to panel integration, and all panelist participated in continuous maintenance training. The panel was consisted of 30 people. Training comprises introducing panelists to company defined sensory terminology (TEXICON® and SWEETABULARY®) and 15 point universal scale ratings benchmarks.

Testing proceeded is follows. Panelists were presented three replicates of each sample in monadic and balanced order. Panelists were given 5 minutes rest between tasting a sample, and were provided palate cleaners of bottled spring water and unsalted saltine crackers. Ratings were collected through Compusense® Cloud data acquisition software and data was analyzed for statistical significance and statistical relevance use XLSTAT (2016) data analysis software.

Samples were prepared by Ingredion's Global Applications Team. Samples were stored and served at 40° F. in 4 ounce plastic cups with lids.

Ballots terminology, definitions, evaluation technique, and benchmark products with their assigned benchmarking rating are provided in Table 11 below.

TABLE 11

Sensory Terminology and Scaling

PEAK CREAMY TEXTURE

| | | |
|---|---|---|
| Definition | The extent to which a sample evenly spreads over the palate and tongue, deforming/stringing rather than shearing/cutting, requiring low force to completely remove from palate. | |
| Technique | Take a spoonful of sample and with consistent force compress and manipulate sample between tongue and palate to measure the peak creamy texture. Use Large spoon | |
| | Baby Food Peas | 2 |
| | Breakstone Fat Free Sour Cream | 7.5 |
| | Jell-O Chocolate Pudding | 13 |

CREAMY TEXTURE - 1st Compression

| | | |
|---|---|---|
| Definition | The extent to which a sample evenly spreads over the palate and tongue, deforming/stringing rather than shearing/cutting, requiring low force to completely remove from palate. | |
| Technique | Take a spoonful of sample and with consistent force compress and manipulate sample between tongue and palate to measure the peak creamy texture. Use Large spoon | |
| | Baby Food Peas | 2 |
| | Breakstone Fat Free Sour Cream | 7.5 |
| | Jell-O Chocolate Pudding | 13 |

CREAMY TEXTURE - 3-5 Compressions

| | | |
|---|---|---|
| Definition | The extent to which a sample evenly spreads over the palate and tongue, deforming/stringing rather than shearing/cutting, requiring low force to completely remove from palate. | |
| Technique | Take a spoonful of sample and with consistent force compress and manipulate sample between tongue and palate 3-5 times to measure the peak creamy texture. Use Large Spoon | |

TABLE 11-continued

Sensory Terminology and Scaling

| | |
|---|---|
| Baby Food Peas | 2 |
| Breakstone Fat Free Sour Cream | 7.5 |
| Jell-O Chocolate Pudding | 13 |
| CREAMY TEXTURE - 8-10 Compressions | |

| | |
|---|---|
| Definition | The extent to which a sample evenly spreads over the palate and tongue, deforming/stringing rather than shearing/cutting, requiring low force to completely remove from palate. |
| Technique | Take a spoonful of sample and with consistent force compress and manipulate sample between tongue and palate 8-10 times to measure the peak creamy texture. Use Large Spoon |
| Baby Food Peas | 2 |
| Breakstone Fat Free Sour Cream | 7.5 |
| Jell-O Chocolate Pudding | 13 |

Sensory testing showed that moderate levels of inhibition thermally inhibited waxy cassava had superior creaminess compared to other tested samples and more specifically the samples had higher peak creaminess rating, and a higher creamy texture rating and the first compression, after 3-5 compressions, and after 8-10 compressions. With reference to FIG. 1 it is seen that a pudding comprising a thermally inihibited waxy cassava starch had higher rating creaminess after a first compression, higher peak creaminess rating, higher creaminess after 3-5 compressions rating, and higher creaminess after 8-10 compressions rating than puddings made using one of thermally inhibited cassava (non-waxy), thermally inhibited waxy corn (standard), thermally inhibited WaxiPro®.

Example 4—Starch Characterization Procedures

Gelatinization Profile by DSC:

This test provides a quantitative measurement of the gelatinization temperatures and gelatinization enthalpy of the energy transformation that occurs during gelatinization of the starch granule in excess water (25 parts starch to 75 parts water). Onset, peak and end melting temperatures for gelatinization are recorded. A PerkinElmer DSC-8500 differential scanning calorimeter equipped with Intracooler 2P and data station and large volume high pressure sample cells is used (available from PerkinElmer, Inc., Waltham, Mass. USA). The cells are prepared by accurately weighing 10 mg of starch (dry basis) and the appropriate amount of distilled water to approximately equal 30 mg of total water weight (moisture of starch and distilled water). The cells are then sealed and allowed to equilibrate overnight at 4° C. before being scanned at from 10° C. to 150° C. at the rate of 10° C./minute. An empty cell is used as the blank. Average values are reported.

Retrogradation Profile by DSC:

This test provides a quantitative measurement of the retrogradation enthalpy of the energy transformation that occurs during storage of gelatinized waxy starches. In addition to melting temperatures, peak temperature and time required for gelatinization are recorded. A PerkinElmer DSC-8500 differential scanning calorimeter equipped with Intracooler 2P and data station and large volume high pressure sample cells is used. The cells are prepared by accurately weighing 10 mg of starch (dry basis) and the appropriate amount of distilled water to approximately equal 20 mg of total water weight (moisture of starch and distilled water). The cells are then sealed and allowed to equilibrate overnight at 4° C. before being scanned at from 10° C. to 140° C. at the rate of 10° C./minute. The cells containing gelatinized starch paste are stored at 5° C. for 7 days. After storage, the samples are rescanned from 10° C. to 140° C. at the rate of 10° C./minute. Retrogradation enthalpy values (J/g) are recorded. An empty cell is used as the blank. Average values are reported.

Starch Damage Analysis Procedure:

Starch damage on the samples was determined using a Megazyme® starch damage assay kit (AACC method 76-31.01; available from Megazyme International Ireland, Bray, Wicklow, Ireland). About 100 mg (db) of starch was weighed into thick walled glass centrifuge tubes and incubated at 40° C. for 5 minutes. 1.0 mL of pre-equilibrated fungal alpha-amylase (50 U/mL) was added to each tube and vortexed. (The concentrated enzyme was diluted in 100 mM sodium acetate buffer at a pH of 5 containing 5 mM calcium chloride—this is the reagent blank as well.) The sample was then incubated at 40° C. for 10 minutes. 8.0 mL of 0.2% (v/v) sulfuric acid was added to stop the reaction and vortexed. The sample was then centrifuged at 300 rpm for 10 minutes. 0.1 mL aliquots of the supernatant were carefully transferred to the bottom of two glass test tubes. 0.1 mL of amyloglucosidase solution (2 U) was added to each sample, vortexed and incubated at 40° C. for 10 minutes. 4.0 mL of GOPOD (Glucose oxidase peroxidase) was added to each sample and vortexed. The samples were incubated at 40° C. for 20 minutes and the absorbance was measured at 510 nm against a reagent blank.

Example 5—Illustrative Starch Preparation

In one embodiment thermally inhibited starch is made as follows: The pH of the samples was raised by slurrying the starch or flour in water at 30-40% solids and adding a sufficient amount of buffer. All samples were spray dried or flash dried as conventional in the art (without gelatinization) to about 2 to about 15% moisture. Control samples were not dehydrated further or heat treated. Measurements of pH on samples before or after the thermal inhibition steps were made on samples consisting of one part anhydrous starch or flour to four parts water. The samples were brought from ambient temperature to 125° C. until the samples became anhydrous, and were further heated to the specified heat treating temperatures. When the heat treating temperature was 165° C., the time to reach that temperature was less than three hours. Moisture level of the samples at the final heating temperature was about 0 wt. % (i.e., anhydrous).

We claim:

1. A method for making an edible composition comprising:
    a) forming a mixture by mixing (i) a thermally inhibited waxy cassava starch having a peak viscosity of between 100 and 500 Brabender Units ("BU") in an amount between 1% and 20% by weight of the mixture and (ii) between 65% and 95% by weight of the mixture of one or more of milk, water, vinegar, and fruit juice;
    b) heating the mixture at a temperature between 50° and 100° C. for 5 to 30 minutes;
    c) subjecting the mixture to homogenization at between 750 and 2750 psi to form the edible composition; and
    wherein the edible composition has a viscosity between 1,000 and 25,000 cP;
    wherein the viscosity is measured at 25° C.

2. The method of claim 1 wherein the thermally inhibited waxy cassava starch has a % starch damage of between 2 and 4% wherein the % starch damage is determined using AACC method 76-31.01.

3. The method of claim 1 wherein the thermally inhibited waxy cassava starch has a gelatinization enthalpy of between 12 and 15 J/g.

4. The method of claim 1 wherein the thermally inhibited waxy cassava starch has a peak viscosity of 100 and 200 BU.

5. The method of claim 1 wherein the thermally inhibited waxy cassava starch is mixed as said in the step a) in an amount between 1% and 10% by weight of the mixture.

6. The method of claim 1 wherein the thermally inhibited waxy cassava starch is mixed as said in the step a) in an amount the between 1% and 3% by weight of the mixture.

7. The method of claim 1 wherein the edible composition has a pH between 4 and 5.

8. The method of claim 1 wherein the edible composition has a viscosity between 1,000 and 15,000 cP wherein the viscosity is measured at 25° C.

9. The method of claim 1 wherein the edible composition has a viscosity between 1,000 and 10,000 cP wherein the viscosity is measured at 25° C.

10. The method of claim 1 wherein the thermally inhibited waxy cassava starch is mixed in the step a) in an amount between 1% and 7.5% by weight of the mixture.

11. The method of claim 1 wherein the thermally inhibited waxy cassava starch is mixed in the step a) in an amount between 1 and 5% by weight of the mixture.

12. The method of claim 1 wherein the edible composition is selected from the group consisting of a yogurt, a creamy soup, a pudding, a custard, a sauce, and a dressing.

13. The method of claim 1 wherein the step a) further comprises mixing one or more other ingredients from the group consisting of a flavoring, an egg, a starch, a flour, a gum, lecithin, gelatin, a dextrin, a maltodextrins, a protein, a protein concentrate, protein isolate.

14. A method for making an edible composition comprising:
   a) forming a mixture by mixing (i) a thermally inhibited waxy cassava starch having a peak viscosity of between 100 and 500 Brabender Units ("BU") in an amount between 1% and 10% by weight of the mixture and (ii) from 65% to 95% (wt. %) of one or more of milk, water, vinegar, and fruit juice;
   b) heating the mixture at a temperature between 50° and 100° C. for 5 to 30 minutes; and
   c) subjecting the mixture to homogenization at between 750 and 2750 psi to form the edible composition;
   wherein the edible composition is a long-term, shelf stable yogurt.

* * * * *